United States Patent
Marsden et al.

(10) Patent No.: US 8,052,210 B2
(45) Date of Patent: Nov. 8, 2011

(54) ENERGY-DISSIPATION SYSTEM

(75) Inventors: Andrew W Marsden, Hingham, MA (US); Ward Fritz, Chelsea, MA (US); Walter S Bezaniuk, Berkley, MA (US); Joe Langley, Foxboro, MA (US); David Amirault, Easton, MA (US)

(73) Assignee: Cosco Management, Inc., Wilmington, DE (US)

( * ) Notice: Subject to any disclaimer, the term of this patent is extended or adjusted under 35 U.S.C. 154(b) by 181 days.

(21) Appl. No.: 12/469,408

(22) Filed: May 20, 2009

(65) Prior Publication Data
US 2010/0295342 A1     Nov. 25, 2010

(51) Int. Cl.
*B60N 2/42* (2006.01)
(52) U.S. Cl. ............ 297/216.11; 297/216.12; 297/250.1
(58) Field of Classification Search ............. 297/216.11, 297/216.1, 216.12, 250.1; 280/729, 739, 280/728.1, 730.1
See application file for complete search history.

(56) References Cited

U.S. PATENT DOCUMENTS

| | | | |
|---|---|---|---|
| 4,366,587 A * | 1/1983 | Takada | 5/94 |
| 4,642,814 A | 2/1987 | Godfrey | |
| 4,899,961 A | 2/1990 | Herndon | |
| 4,919,483 A | 4/1990 | Horkey | |
| 5,235,715 A | 8/1993 | Donzis | |
| 5,292,175 A | 3/1994 | Artz | |
| 5,292,176 A | 3/1994 | Artz | |
| 5,335,968 A | 8/1994 | Sheridan et al. | |
| 5,567,015 A | 10/1996 | Arias | |
| 5,881,395 A | 3/1999 | Donzis | |
| 6,485,101 B2 * | 11/2002 | Kassai et al. | 297/250.1 |
| 6,519,780 B2 | 2/2003 | Goodwin | |
| 6,692,072 B2 * | 2/2004 | Nelson et al. | 297/250.1 |
| 7,125,073 B2 * | 10/2006 | Yoshida | 297/216.11 |
| 7,232,182 B2 * | 6/2007 | Yoshida | 297/216.11 |
| 7,234,771 B2 | 6/2007 | Nakhla | |
| 7,246,853 B2 * | 7/2007 | Harcourt et al. | 297/250.1 |
| 7,293,828 B2 * | 11/2007 | Yoshida | 297/216.11 |
| 7,654,613 B2 | 2/2010 | Bass | |
| 7,717,506 B2 | 5/2010 | Amesar et al. | |
| 7,726,734 B2 | 6/2010 | Mahal et al. | |
| 7,744,154 B2 * | 6/2010 | Marsden et al. | 297/216.11 |
| 7,748,781 B2 | 7/2010 | Bass | |
| 7,774,866 B2 | 8/2010 | Ferrara | |
| 7,850,234 B2 * | 12/2010 | Marsden et al. | 297/216.11 |
| 2001/0043001 A1 | 11/2001 | Kassai et al. | |

(Continued)

FOREIGN PATENT DOCUMENTS
EP     0928718     7/1999
(Continued)

OTHER PUBLICATIONS

International Preliminary Report on Patentability (Ch. II) issued in connection with PCT/US2008/087382 and completed by the US Examining Authority on Oct. 9, 2010.

(Continued)

*Primary Examiner* — David Dunn
*Assistant Examiner* — Erika Garrett
(74) *Attorney, Agent, or Firm* — Barnes & Thornburg LLP

(57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

20 Claims, 3 Drawing Sheets

U.S. PATENT DOCUMENTS

| | | |
|---|---|---|
| 2002/0153753 A1 | 10/2002 | Kassai |
| 2007/0000743 A1* | 1/2007 | Naitou et al. .............. 188/322.2 |
| 2007/0085394 A1 | 4/2007 | Yang |
| 2007/0216203 A1* | 9/2007 | Rajasingham ........... 297/216.11 |
| 2007/0252418 A1 | 11/2007 | Harcourt et al. |
| 2008/0258518 A1 | 10/2008 | Santamaria |
| 2009/0152913 A1 | 6/2009 | Amesar et al. |
| 2009/0179469 A1 | 7/2009 | Bass |
| 2009/0179470 A1 | 7/2009 | Bass |
| 2009/0256404 A1 | 10/2009 | Strong et al. |
| 2010/0019554 A1 | 1/2010 | Mahal et al. |
| 2010/0026064 A1 | 2/2010 | Marsden et al. |
| 2010/0134470 A1 | 6/2010 | Bu et al. |
| 2010/0194158 A1 | 8/2010 | Mahal et al. |

FOREIGN PATENT DOCUMENTS

| | | |
|---|---|---|
| EP | 1167114 | 1/2002 |
| WO | 2009076514 | 6/2009 |

OTHER PUBLICATIONS

European Search Report dated Aug. 31, 2010, for related European Application No. EP 10163494.

International Search Report dated Feb. 13, 2009, for International Application No. PCT/US2008/087382.

* cited by examiner

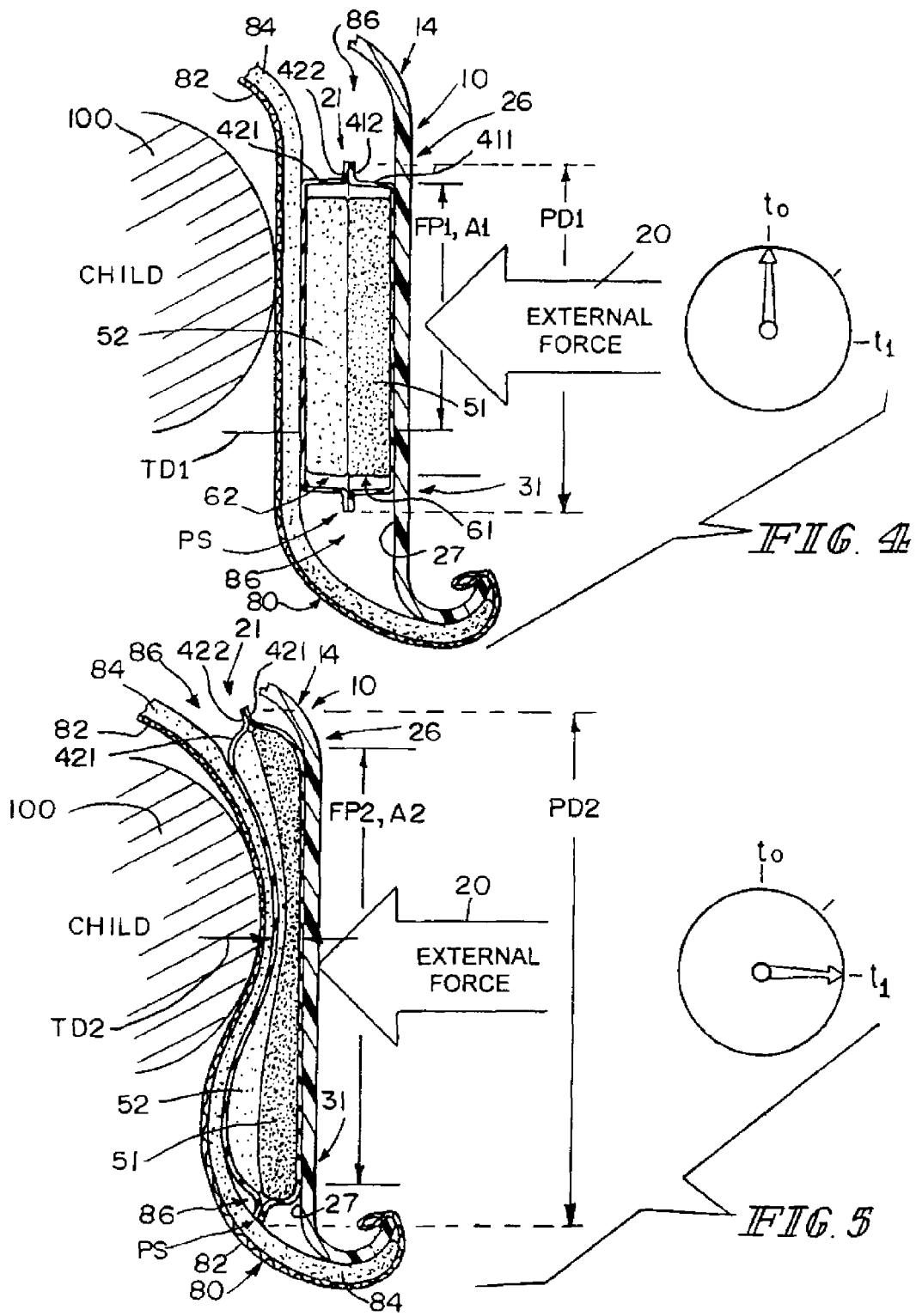

ENERGY-DISSIPATION SYSTEM

BACKGROUND

The present disclosure relates to energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in gs. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in gs.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the energy-dissipation system includes a ride-down pad coupled to the juvenile vehicle seat. The ride-down pad is configured to provide means for absorbing external energy applied to the ride-down pad to minimize g-loads experienced by a child seated in a juvenile vehicle seat exposed to an external impact force.

In illustrative embodiments, the ride-down pad includes an air bag for holding air or other fluid in an air chamber until deformation of the air bags following exposure to an external impact force. The air bag is made of a deformable material.

In illustrative embodiments, the ride-down pad also includes a deformable support frame located in the air chamber of the air bag. The deformable support frame provides means for supporting the air bag to maintain a predetermined initial shape of the air bag until the air bag is deformed when exposed to an external impact force so that the air bag does not deform too quickly and deforms at a rate that allows the ride-down pad to absorb external energy associated with the external impact force. External energy is absorbed as the deformable support frame is compressed after exposure of the air bag to an external impact force In illustrative embodiments, the air bag includes an inner shell and an outer shell that mates with the inner shell to form a closed chamber. A deformable support frame is positioned to lie in the closed chamber provided between the inner and outer shells.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4 shows a diagrammatic representation of a child at a time $t_0$ before an external impact force is applied to the first side-wing panel of the headrest; and FIG. 5 is a diagrammatic view similar to FIG. 4 at a later time $t_1$ after the external impact force has been applied to the first side-wing panel and showing partial deformation of the air bag and the inner and outer bodies lying in the air chamber formed in the air bag and cooperating to define the deformable support frame so as to minimize the magnitude of a resulting force applied to a child seated in a juvenile vehicle seat carrying the right-side ride-down pad and thereby to minimize the g-load (acceleration) caused by the resulting force and experienced by the seated child.

DETAILED DESCRIPTION

Figure 1:
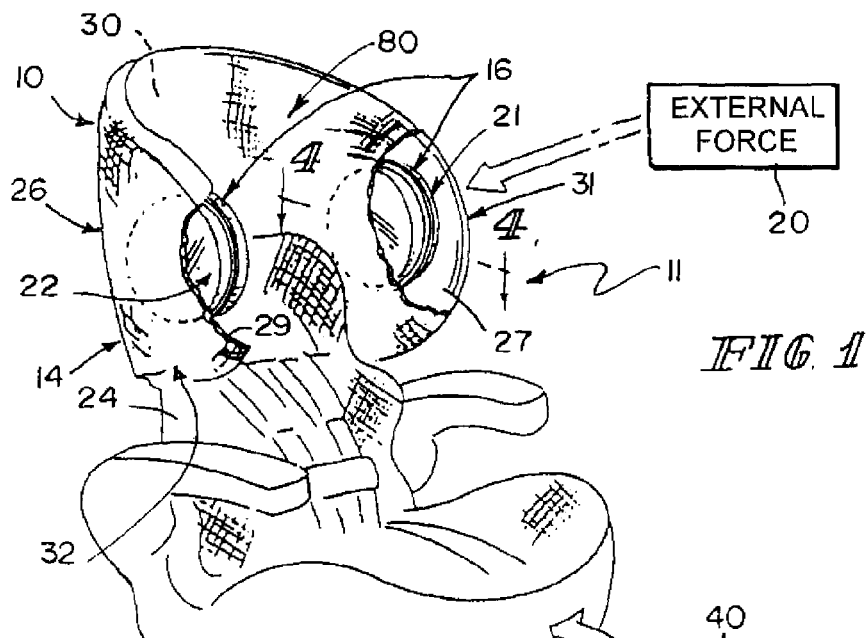
FIG. 1 is a perspective view of a child-restraint system including a juvenile vehicle seat having a seat bottom and a seat back extending upwardly from the seat bottom and an energy-dissipation system coupled to the seat back and made in accordance with the present disclosure, with portions broken away, and showing that the seat back comprises a backrest coupled to the seat bottom and a headrest coupled to the backrest and that the energy-dissipation system comprises a right-side ride-down pad mounted on an inner wall of a first side-wing panel included in the headrest and a left-side ride-down pad mounted on an inner wall of an opposite second side-wing panel included in the headrest and showing an external impact force about to strike an outer portion of the first side-wing panel carrying the right-side ride-down pad.

An illustrative child-restraint system 11 includes a juvenile vehicle seat 10 and an energy-dissipation system 16 coupled to juvenile vehicle seat 10 as suggested in FIG. 1. In illustrative embodiments, juvenile vehicle seat 10 includes a seat bottom 12 and a seat back 14 extending upwardly from seat bottom 12 and carrying energy-dissipation system 16.

Energy-dissipation system 16 comprises ride-down pads that are designed to minimize the g-loads experienced by a child seated on seat bottom 12 of juvenile vehicle seat 10 during exposure of seat 10 to an external impact force. Ride-down pads 21, 22 are shown, for example, in FIG. 1. Reference is hereby made to U.S. application Ser. No. 12/327,376 filed Dec. 4, 2008, the entirety of which is hereby incorporated by reference herein, for disclosures of various ride-down pad configurations and mounting arrangements.

As suggested in FIG. 1, seat back 12 of juvenile vehicle seat 10 includes a backrest 24 arranged to extend upwardly from seat bottom 12 and a headrest 26 coupled to backrest 24. Right-side ride-down pad 21 is coupled to an inner wall 27 of a first side-wing panel 31 included in headrest 26 as suggested in FIGS. 1 and 3-5. Left-side ride-down pad 22 is coupled to an inner wall 29 of a second side-wing panel 32 included in headrest 26 as shown in FIG. 1. A rear panel 30 is included in headrest 26 and arranged to interconnect first and second side-wing panels 31, 32 as suggested in FIG. 1.

During a collision or other incident, application of an external impact force 20 to first side-wing panel 31 of headrest 26 causes energy to be transferred from an impacting object (not shown) to right-side ride-down pad 21 as suggested in FIGS. 1, 4, and 5. Ride-down pad 21 absorbs that transferred energy as suggested in FIGS. 4 and 5. Transferred energy is absorbed to minimize the magnitude of a resulting force applied to a child 100 seated in juvenile vehicle seat 10 by a force transmitter 200 comprising outer cover 80, right-side ride-down pad 21, and first side-wing panel 31 (all included in juvenile vehicle seat 10) during the collision.

Ride-down pad 21 functions to minimize the g-loads (acceleration) experienced by child 100 seated on seat bottom 12 of juvenile vehicle seat 10 during exposure of seat 10 to external impact force 20 as suggested in FIGS. 4 and 5. Ride-down pad 21 also functions to maximize the time interval (i.e., ride-down time) between the moment the impacting object strikes juvenile vehicle seat to apply the external impact force 20 to ride-down pad 21 and the moment that resulting force reaches zero. Ride-down pad 22 functions in a manner similar to ride-down pad 21.

Absorption of external energy associated with external energy associated with external impact force 20 by right-side ride-down pad 21 is shown illustratively and diagrammatically in a sequence shown in FIGS. 4 and 5. Left-side ride-down pad 22 absorbs external energy in a similar manner when an external impact force strikes a second side-wing panel 32 carrying left-side ride-down pad 22. It is within the scope of the present disclosure to mount one of ride-down pads 21, 22 in an impact strike zone on a juvenile seat or other device. It is within the scope of the present disclosure to mount a ride-down pad on an exterior or interior wall (or both an interior and exterior wall) of the seat or device.

Figure 2:
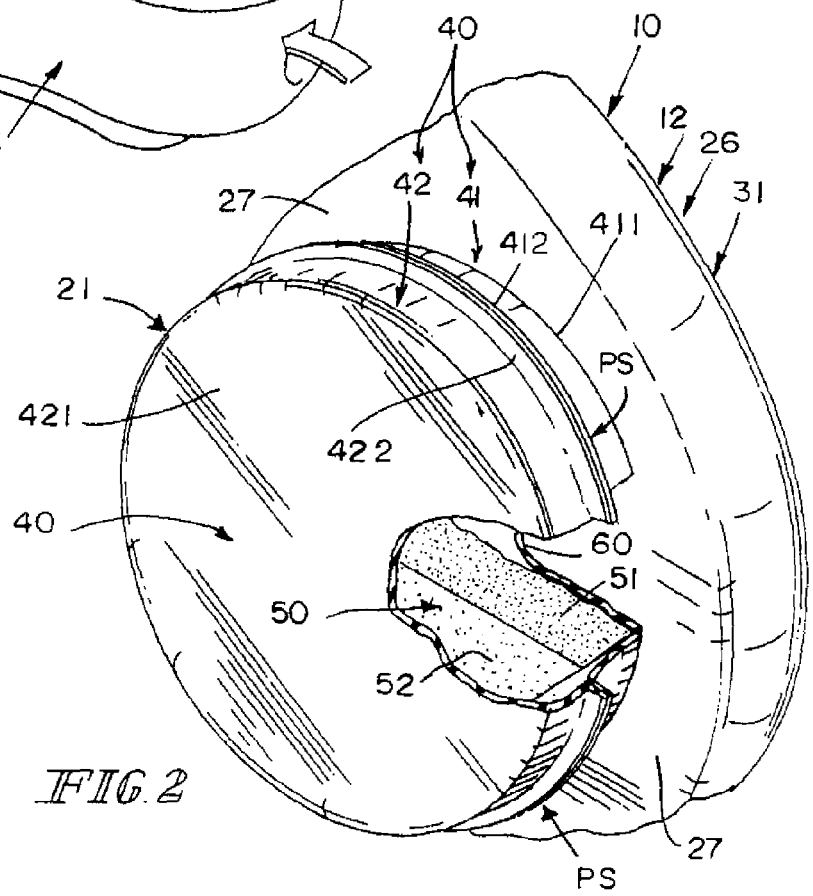
FIG. 2 is an enlarged perspective view of the right-side ride-down pad mounted on the first side-wing panel of the headrest shown in FIG. 1, with portions broken away, showing an inner shell coupled to the juvenile vehicle seat, an outer shell arranged to lie in spaced-apart relation to the juvenile vehicle seat to locate the inner shell therebetween and mated with the inner shell to form a closed chamber therebetween.
Figure 3:
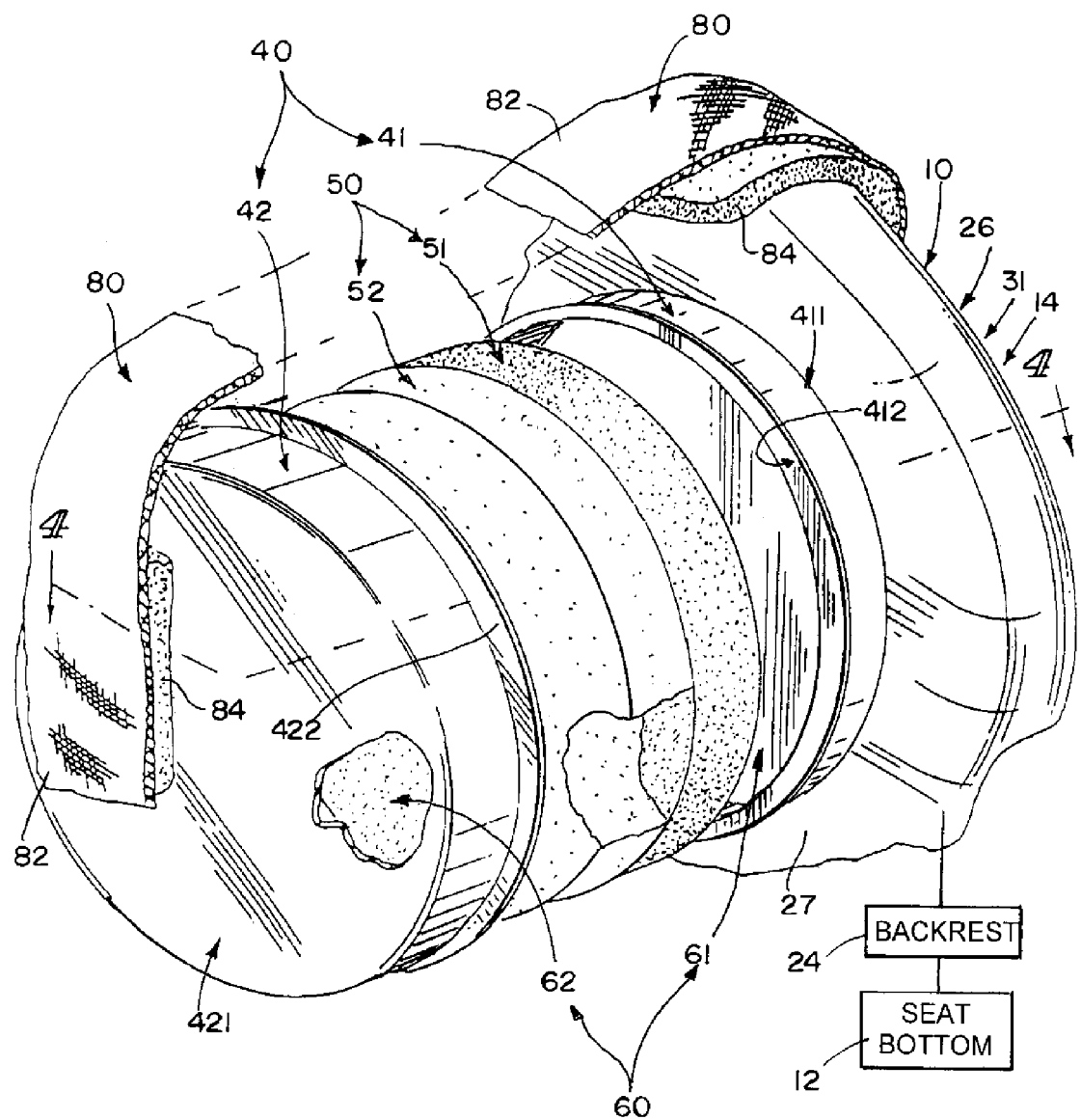
FIG. 3 is an exploded perspective assembly view of the right-side ride-down pad of FIGS. 1 and 2 showing that the ride-down pad comprises, in sequence, from right to left, an inner shell, a deformable support frame comprising an inner body and a separate outer body, and an outer shell and suggesting that the inner shell and the outer shell cooperate to form an air bag having an a closed chamber sized to receive the inner and outer bodies of deformable support frame therein.

As suggested in FIGS. 2 and 3, right-side ride-down pad 21 includes an air bag 40 and a deformable support frame 50 as suggested in FIGS. 2 and 3. Air bag 40 is formed to include a closed chamber 60. Deformable support frame 50 is located in closed chamber 60 as suggested in FIGS. 2 and 3.

In an illustrative embodiment, as suggested in FIGS. 2 and 3, air bag 40 comprises an inner shell 41 and an outer shell 42. Inner shell 41 mates with outer shell 42 to form a closed chamber 60 as shown, for example, in FIGS. 2 and 4.

Deformable support frame 50 as disclosed herein provides means located in closed chamber 60 for supporting air bag 40 to maintain a predetermined initial shape of air bag 40 until air bag 40 is deformed when exposed to an external impact force 20 as suggested in FIGS. 4 and 5. Air bag 40 is thus supported by deformable support frame 50 so that air bag 40 does not deform too quickly and deforms at a rate that allows air bag 40 to absorb external energy associated with external impact force 20.

Ride-down pad 21 includes an air bag 40 formed to include a closed chamber 60 and made of an expansible material to cause air bag 40 to have a variable thickness dimension TD and a variable perimeter dimension PD as suggested in FIGS. 4 and 5. Ride-down pad 21 also includes a deformable support frame 50 located in closed chamber 60. Deformable support frame 50 is configured to provide means in closed chamber 60 for supporting air bag 40 in a distended and unflattened state as suggested in FIGS. 2 and 4 to maintain a predetermined initial first perimeter dimension PD1 of air bag 40 until air bag 40 is deformed when exposed to an external impact force 20 sufficient to cause air bag 40 to vary in shape to assume an expanded and flattened state as suggested in FIG. 5 wherein air bag 40 is characterized by a second perimeter dimension PD2 that is greater than the initial first perimeter dimension PD1 owing at least in part to stretching of the expansible material forming air bag 40 during deformation of air bag 40 so that ride-down pad 21 absorbs external energy associated with an external impact force 20 applied to juvenile vehicle seat 10 to minimize g-loads experienced by a child seated on juvenile vehicle seat 10.

Air bag 40 is arranged to contact a surface 27 included in first side-wing panel 31 of juvenile vehicle seat 10 to establish a first footprint FP1 of a first area A1 on surface 27 when air bag 40 is supported by deformable support frame 50 in the distended and unflattened state characterized by the first perimeter dimension PD1 as suggested in FIG. 4. Air bag 40 is arranged to contact surface 27 to establish a second footprint FP2 of a second area A2 that is larger than first area A1 when air bag 40 is deformed to assume the expanded and flattened state characterized by second perimeter dimension PD2 as suggested in FIG. 5.

Juvenile vehicle seat 10 further includes an outer cover 80 coupled to headrest 26 as suggested in FIGS. 1 and 3-5. Outer cover 80 is arranged to cover ride-down pad 21 and cooperate with first side-wing panel 31 to form a pad-receiving space 86 therebetween as suggested in FIGS. 4 and 5. Air bag 40 is located in pad-receiving space 86 in both of the distended and unflattened states as suggested in FIGS. 2 and 4 and the expanded and flattened state as suggested in FIG. 5.

Air bag 40 includes an inner shell 41 coupled to the surface and an outer shell 42 coupled to inner shell 41 to form closed chamber 60 therebetween. Each of inner and outer shells 41, 42 is imperforate. Each of inner and outer shells 41, 42 is made of an expansible material such as a thin film. A suitable expansible material within the scope of this disclosure is able to stretch as suggested in FIGS. 4 and 5 when exposed to external impact force 20.

Outer cover 80 is arranged to cover outer shell 42 as suggested in FIGS. 1 and 3-5. Each of outer shell 42 and a portion of outer cover 80 covering outer shell 42 is located in a space provided between first and second side-wing panels 31, 32 as suggested in FIG. 1.

Inner shell 41 includes a first web 411 coupled to juvenile vehicle seat 10 and a first outturned brim 412 appended to first web 411 and arranged to surround first web 411. Outer shell 42 includes a second web 421 and a second outturned brim 422 appended to second web 421 and arranged to surround second web 421. First and second outturned brims 412, 422 mate and cooperate to extend away from first and second webs 411, 421 and closed chamber 60 to form perimetral seam PS as suggested in FIGS. 2, 4, and 5.

First web 411 is arranged to contact the surface to establish a first footprint FP1 of a first area A1 on surface 27 when first web 411 is supported by deformable support frame 50 in the distended and unflattened state characterized by the first perimeter dimension PD1 as suggested in FIGS. 2 and 4. First web 411 is arranged to contact surface 27 to establish a second footprint FP2 of a second area A2 that is larger than first area A1 when air bag 40 is deformed to assume the expanded and flattened state characterized by second perimeter dimension PD2 as suggested in FIG. 5.

Deformable support frame 50 is made of at least one deformable material and is configured to change shape during deformation of air bag 40 as shown, for example, in FIGS. 4 and 5. In an illustrative embodiment, deformable support frame 50 comprises an inner body 51 and a separate outer body 52 positioned to lie alongside inner body 51 as shown in FIGS. 2-5. Inner body 51 is made of a first deformable material in an illustrative embodiment. Outer body 52 is made of a second deformable material that is different from the first deformable material in an illustrative embodiment. Inner and outer shells 41, 42 are made of an expansible material and cooperate to form air bag 40 containing deformable support frame 50. It is within the scope of the present disclosure to use only one body to form deformable support frame or two form both bodies 51, 52 using the same deformable material. Ride-down pad 21 is configured to absorb external energy associated with an external impact force 20 applied to juvenile vehicle seat 10 during stretching of the expansible material associated with deformation of air bag 40 and deformation of deformable support frame 50 to minimize g-loads experienced by a child seated on juvenile vehicle seat 10.

Inner and outer shells 41, 42 mate to establish a perimeteral seam PS extending around air bag 40. Perimeteral seam PS has a perimeter equal to the initial first perimeter dimension PD1 when air bag 40 is supported by deformable support frame 50 to assume the distended and unflattened state as suggested in FIGS. 2 and 4 and a perimeter equal to the second perimeter dimension PD2 when air bag 40 is deformed to assume the expanded and flattened state as suggested in FIG. 5.

Air bag 40 includes an inner shell 41 formed to include a first cavity 61 and an outer shell 42 formed to include a second cavity 62 as shown best in FIGS. 3 and 4. Outer shell 42 is coupled to inner shell 41 to cause first and second cavities 61, 62 to communicate with one another to establish closed chamber 60 of air bag 40. Inner body 51 is located in first cavity 61 as shown in FIGS. 2 and 4. Outer body 52 is located in a second cavity 62 as shown in FIGS. 2 and 4.

As suggested diagrammatically in FIG. 4, each of inner and outer bodies 51, 52 included in deformable support frame 50 of right-side ride-down pad 21 is substantially undeformed at time $t_0$ before any collision involving juvenile vehicle seat 10 takes place as suggested in FIG. 4. Ride-down pad 21 comprises an undeformed air bag 40 and an undeformed deformable support frame 50 as suggested in FIGS. 2-4.

As suggested diagrammatically in FIG. 5, during an illustrative collision, external impact force 20 strikes first side-wing panel 31 of headrest 26 to deform a portion of inner body 51 and outer body 52. During such deformation, at later time $t_1$, the thickness of deformable support frame 50 is no longer a uniform first thickness TD1, but at least a portion of deformable support frame 50 is compressed to assume a lesser second thickness TD2 as suggested in FIG. 5. As also suggested in FIG. 5, compression of deformable support frame 50 causes ride-down pad 21 to change shape as air bag 40 is moved from a distended and unflattened state shown, for example, in FIGS. 1, 2, and 4 to assume the expanded and flattened state shown, for example, in FIG. 5. At time $t_1$, some of the transferred energy associated with external impact force 20 has been dissipated owing, in part, to deformation of air bag 40 and deformable support frame 50.

As suggested in FIG. 5, juvenile vehicle seat 10 has moved relative to child 100 to cause a portion (e.g., the head) of child 100 to contact and deform right-side ride-down pad 21. Inner and outer bodies 51, 52 of right-side ride-down pad 21 cooperate to absorb energy transferred by external impact force 20 to minimize a resulting force applied to child 100 seated in juvenile vehicle seat 10. This energy absorption feature minimizes the g-loads (acceleration) experienced by child 100 and also maximizes the ride-down time between the first strike of an impacting object on first side-wing panel 31 of headrest 26 of juvenile vehicle seat 10 and the moment that the resulting force reaches zero.

The invention claimed is:

1. A child restraint comprising
a juvenile vehicle seat and
an energy-dissipation system coupled to the juvenile vehicle seat, the energy-dissipation system comprising a ride-down pad including an air bag made of an expansible material to cause the air bag to have a variable thickness and a variable perimeter and formed to include a closed chamber and a deformable support frame located in the closed chamber, wherein the deformable support frame is configured to provide means in the closed chamber for supporting and completely enclosing the air bag in a distended and unflattened state to maintain a predetermined initial first perimeter dimension of the air bag until the air bag is deformed when exposed to an external impact force sufficient to cause the air bag to vary in shape to assume an expanded and flattened state wherein the air bag is characterized by a second perimeter dimension that is greater than the initial first perimeter dimension owing at least in part to stretching of the expansible material forming the air bag during deformation of the air bag so that the ride-down pad absorbs external energy associated with an external impact force applied to the juvenile vehicle seat to minimize g-loads experienced by a child seated on the juvenile vehicle seat.

2. The child restraint of claim 1, wherein the juvenile vehicle seat includes a surface, the air bag is arranged to contact the surface to establish a first footprint of a first area on the surface when the air bag is supported by the deformable support frame in the distended and unflattened state characterized by the first perimeter dimension, and the air bag is arranged to contact the surface to establish a second footprint of a second area that is larger than the first area when the air bag is deformed to assume the expanded and flattened state characterized by the second perimeter dimension.

3. The child restraint of claim 2, wherein the juvenile vehicle seat includes a seat back comprising a rear panel, a first side-wing panel extending in a forward direction from the rear panel, and a second side-wing panel extending in the forward direction lying in spaced-apart relation to the first side-wing panel to locate the rear panel therebetween, and the surface is included in the first side wing panel.

4. The child restraint of claim 3, wherein the juvenile vehicle seat further includes an outer cover coupled to the headrest and arranged to cover the ride-down pad and cooperate with the first side-wing panel to form a pad-receiving space therebetween and the air bag is located in the pad-receiving space in both of the distended and unflattened states and the expanded and flattened state.

5. The child restraint of claim 2, wherein the air bag includes an inner shell coupled to the surface and an outer shell coupled to the inner shell to form the closed chamber therebetween, the outer cover is arranged to cover the outer shell, and each of the first and second footprints is established on the surface by mating engagement of the inner shell and the surface.

6. The child restraint of claim 5, wherein the juvenile vehicle seat includes a seat back comprising a rear panel, a first side-wing panel extending in a forward direction from the rear panel, and a second side-wing panel extending in the forward direction lying in spaced-apart relation to the first side-wing panel to locate the rear panel therebetween, and the surface is included in the first side wing panel, each of the outer shell and a portion of the outer cover covering the outer shell is located in a space provided between the first and second side-wing panels.

7. The child restraint of claim 1, wherein the ride-down pad includes an inner shell and an outer shell coupled to the inner shell to form the closed chamber therebetween and the inner shell is coupled to the juvenile vehicle seat.

8. The child restraint of claim 7, wherein each of the inner and outer shells is imperforate.

9. The child restraint of claim 7, wherein each of the inner and outer shells is made of a thin film.

10. The child restraint of claim 7, wherein the inner and outer shells mate to establish a perimeteral seam extending around the air bag and the perimeteral seam has a perimeter equal to the initial first perimeter dimension when the air bag is supported by the deformable support frame to assume the distended and unflattened state and a perimeter equal to the second perimeter dimension when the air bag is deformed to assume the expanded and flattened state.

11. The child restraint of claim 10, wherein the inner shell includes a first web coupled to the juvenile vehicle seat and a first outturned brim appended to the first web and arranged to surround the first web, the outer shell includes a second web and a second outturned brim appended to the second web and arranged to surround the second web, and the first and second outturned brims mate and cooperate to extend away from the first and second webs and the closed chamber to form the perimetral seam.

12. The child restraint of claim 11, wherein the juvenile vehicle seat includes a surface, the first web is arranged to contact the surface to establish a first footprint of a first area on the surface when the first web is supported by the deformable support frame in the distended and unflattened state characterized by the first perimeter dimension, and the first web is arranged to contact the surface to establish a second footprint of a second area that is larger than the first area when the air bag is deformed to assume the expanded and flattened state characterized by the second perimeter dimension.

13. The child restraint of claim 1, wherein the deformable support frame is made of at least one deformable material and is configured to change shape during deformation of the air bag.

14. The child restraint of claim 13, wherein the deformable support frame comprises an inner body and a separate outer body positioned to lie alongside the inner body.

15. The child restraint of claim 14, wherein the air bag includes an inner shell formed to include a first cavity and an outer shell formed to include a second cavity and coupled to the inner shell to cause the first and second cavities to communicate with one another to establish the closed volume of the air bag, the inner body is located in the first cavity, and the outer body is located in the second cavity.

16. The child restraint of claim 14, wherein the inner body is made of a first deformable material and the outer body is made of a second deformable material that is different from the first deformable material.

17. A child restraint comprising
a juvenile vehicle seat and
an energy-dissipation system comprising a ride-down pad including an inner shell coupled to the juvenile vehicle seat, an outer shell coupled to the inner shell to form a closed chamber therebetween, and a deformable support frame located in the closed chamber, wherein the inner and outer shells are made of an expansible material and cooperate to form an air bag containing the deformable support frame and the ride-down pad is configured to absorb external energy associated with an external impact force applied to the juvenile vehicle seat during stretching of the expansible material associated with deformation of the air bag and deformation of the deformable support frame to minimize g-loads experienced by a child seated on the juvenile vehicle seat.

18. The child restraint of claim 17, wherein the juvenile vehicle seat includes a seat back comprising a rear panel, a first side-wing panel extending in a forward direction from the rear panel, and a second side wing panel extending in a forward direction lying in spaced-apart relation to the first side-wing panel to locate the rear panel, the inner and outer shells, and the deformable support frame therebetween.

19. The child restraint of claim 17, wherein the inner and outer shells mate to establish a perimeteral seam extending around the air bag and the perimeteral seam has a perimeter equal to the initial first perimeter dimension when the air bag is supported by the deformable support frame to assume the distended and unflattened state and a perimeter equal to the second perimeter dimension when the air bag is deformed to assume the expanded and flattened state.

20. A child restraint comprising
a juvenile vehicle seat and
an energy-dissipation system comprising a ride-down pad including a deformable support frame and an air bag providing means for holding and completely enclosing the deformable support frame in a closed chamber alongside a portion of the juvenile vehicle seat during exposure of the juvenile vehicle seat to an external impact force so that the deformable support frame in an undeformed state supports the air bag to cause the air bag to assume a first shape characterized by a first perimeter dimension and the deformable support frame in a deformed state is compressed during deformation of the air bag caused by exposure of the air bag to the external impact force to cause the air bag to assume a second shape characterized by a second perimeter dimension that is greater than the first perimeter dimension and thereby cause the air bag and the deformable support frame to cooperate to absorb external energy associated with the external impact force applied to the juvenile vehicle seat to minimize g-loads experienced by a child seated on the juvenile vehicle seat.

* * * * *